United States Patent
Kakhandiki

(10) Patent No.: US 10,853,097 B1
(45) Date of Patent: Dec. 1, 2020

(54) ROBOTIC PROCESS AUTOMATION WITH SECURE RECORDING

(71) Applicant: Automation Anywhere Inc., San Jose, CA (US)

(72) Inventor: Abhijit Kakhandiki, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 357 days.

(21) Appl. No.: 15/883,020

(22) Filed: Jan. 29, 2018

(51) Int. Cl.
*G06F 3/048* (2013.01)
*G06F 9/451* (2018.01)
*G05B 19/4155* (2006.01)
*G06F 3/0482* (2013.01)
*G06F 3/0483* (2013.01)

(52) U.S. Cl.
CPC ......... *G06F 9/451* (2018.02); *G05B 19/4155* (2013.01); *G05B 2219/40153* (2013.01); *G06F 3/0482* (2013.01); *G06F 3/0483* (2013.01)

(58) Field of Classification Search
None
See application file for complete search history.

(56) References Cited

U.S. PATENT DOCUMENTS

| | | |
|---|---|---|
| 5,949,999 A | 9/1999 | Song et al. |
| 5,983,001 A | 11/1999 | Boughner et al. |
| 6,133,917 A | 10/2000 | Feigner et al. |
| 6,389,592 B1 | 5/2002 | Ayres et al. |
| 6,427,234 B1 | 7/2002 | Chambers et al. |
| 6,473,794 B1 | 10/2002 | Guheen et al. |
| 6,496,979 B1 | 12/2002 | Chen et al. |
| 6,640,244 B1 | 10/2003 | Bowman-Amuah |
| 6,704,873 B1 | 3/2004 | Underwood |
| 6,898,764 B2 | 5/2005 | Kemp |
| 7,091,898 B2 | 8/2006 | Arling et al. |
| 7,246,128 B2 | 7/2007 | Jordahl |
| 7,441,007 B1 | 10/2008 | Kirkpatrick et al. |

(Continued)

OTHER PUBLICATIONS

Kakhandiki, Abhijit, 'Record' Is Critical for Enterprise—Grade RPA, Sep. 21, 2016, https://www.automationanywhere.com/blog/product-insights/record-is-critical-for-enterprise-grade-rpa (Year: 2016).*

(Continued)

*Primary Examiner* — William C Trapanese
(74) *Attorney, Agent, or Firm* — Prasad IP, PC

(57) ABSTRACT

A robotic process automation system operates to generate a plurality of bots, each bot comprising one or more configurable commands arranged to perform assigned tasks. A processor is configured to execute instructions that when executed cause the processor to provide to a user a plurality of recorders to permit the user to create one or more bots for storage in data storage. The instructions implement a plurality of recorders to permit capture of user interaction in a variety of application environments. A secure recording mode is selectable by an administrator of the robotic process automation system, for preventing display to a user of an entire screen of information generated by an application while the user is generating a bot. The administrator can employ the robotic process automation system permit display to the user of only selected fields of information, along with associated labels.

20 Claims, 5 Drawing Sheets

(56) References Cited

U.S. PATENT DOCUMENTS

| | | | |
|---|---|---|---|
| 7,533,096 B2 | 5/2009 | Rice et al. | |
| 7,568,109 B2 | 7/2009 | Powell, Jr. et al. | |
| 7,765,525 B1 | 7/2010 | Davidson et al. | |
| 7,805,317 B2 | 9/2010 | Khan et al. | |
| 7,805,710 B2 | 9/2010 | North | |
| 7,810,070 B2 | 10/2010 | Nasuti et al. | |
| 7,846,023 B2 | 12/2010 | Evans et al. | |
| 8,028,269 B2 | 9/2011 | Bhatia et al. | |
| 8,056,092 B2 | 11/2011 | Allen et al. | |
| 8,095,910 B2 | 1/2012 | Nathan et al. | |
| 8,132,156 B2 | 3/2012 | Malcolm | |
| 8,234,622 B2 | 7/2012 | Meijer et al. | |
| 8,438,558 B1 | 5/2013 | Adams | |
| 8,443,291 B2 | 5/2013 | Ku et al. | |
| 8,464,240 B2 | 6/2013 | Fritsch et al. | |
| 8,498,473 B2 | 7/2013 | Chong et al. | |
| 8,504,803 B2 | 8/2013 | Shukla | |
| 8,682,083 B2 | 3/2014 | Kumar et al. | |
| 8,769,482 B2 | 7/2014 | Batey et al. | |
| 8,965,905 B2 | 2/2015 | Ashmore et al. | |
| 9,213,625 B1 | 12/2015 | Schrage | |
| 9,278,284 B2 | 3/2016 | Ruppert et al. | |
| 9,444,844 B2 | 9/2016 | Edery et al. | |
| 9,462,042 B2 | 10/2016 | Shukla et al. | |
| 2003/0033590 A1 | 2/2003 | Leherbauer | |
| 2003/0101245 A1 | 5/2003 | Srinivasan et al. | |
| 2003/0159089 A1 | 8/2003 | DiJoseph | |
| 2004/0083472 A1 | 4/2004 | Rao et al. | |
| 2004/0172526 A1 | 9/2004 | Tann et al. | |
| 2004/0210885 A1 | 10/2004 | Wang et al. | |
| 2004/0243994 A1 | 12/2004 | Nasu | |
| 2005/0188357 A1 | 8/2005 | Derks et al. | |
| 2005/0204343 A1 | 9/2005 | Kisamore et al. | |
| 2005/0257214 A1 | 11/2005 | Moshir et al. | |
| 2006/0095276 A1 | 5/2006 | Axelrod et al. | |
| 2006/0150188 A1 | 7/2006 | Roman et al. | |
| 2007/0101291 A1 | 5/2007 | Forstall et al. | |
| 2007/0112574 A1 | 5/2007 | Greene | |
| 2008/0005086 A1 | 1/2008 | Moore | |
| 2008/0028392 A1 | 1/2008 | Chen et al. | |
| 2008/0209392 A1 | 8/2008 | Able et al. | |
| 2008/0222454 A1 | 9/2008 | Kelso | |
| 2008/0263024 A1 | 10/2008 | Landschaft et al. | |
| 2009/0037509 A1 | 2/2009 | Parekh et al. | |
| 2009/0103769 A1 | 4/2009 | Milov et al. | |
| 2009/0172814 A1 | 7/2009 | Khosravi et al. | |
| 2009/0199160 A1 | 8/2009 | Vaitheeswaran et al. | |
| 2009/0217309 A1 | 8/2009 | Grechanik et al. | |
| 2009/0249297 A1 | 10/2009 | Doshi et al. | |
| 2009/0313229 A1 | 12/2009 | Fellenstein et al. | |
| 2009/0320002 A1 | 12/2009 | Peri-Glass et al. | |
| 2010/0023602 A1 | 1/2010 | Martone | |
| 2010/0023933 A1 | 1/2010 | Bryant et al. | |
| 2010/0100605 A1 | 4/2010 | Allen et al. | |
| 2010/0235433 A1 | 9/2010 | Ansari et al. | |
| 2011/0022578 A1 | 1/2011 | Fotev | |
| 2011/0145807 A1 | 6/2011 | Molinie et al. | |
| 2011/0197121 A1 | 8/2011 | Kletter | |
| 2011/0276568 A1 | 11/2011 | Fotev | |
| 2011/0276946 A1 | 11/2011 | Pletter | |
| 2011/0302570 A1 | 12/2011 | Kurimilla et al. | |
| 2012/0042281 A1 | 2/2012 | Green | |
| 2012/0124062 A1 | 5/2012 | Macbeth et al. | |
| 2012/0310914 A1* | 12/2012 | Khan | G06F 16/951 707/710 |
| 2012/0330940 A1 | 12/2012 | Caire et al. | |
| 2013/0173648 A1 | 7/2013 | Tan et al. | |
| 2013/0290318 A1 | 10/2013 | Shapira et al. | |
| 2014/0181705 A1 | 6/2014 | Hey et al. | |
| 2015/0082280 A1 | 3/2015 | Betak et al. | |
| 2015/0347284 A1 | 12/2015 | Hey et al. | |
| 2016/0019049 A1 | 1/2016 | Kakhandiki et al. | |
| 2016/0078368 A1 | 3/2016 | Kakhandiki et al. | |
| 2018/0074931 A1* | 3/2018 | Garcia | G06F 9/451 |
| 2018/0197123 A1* | 7/2018 | Parimelazhagan | G06Q 10/0633 |

OTHER PUBLICATIONS

B. P. Kasper "Remote: A Means of Remotely Controlling and Storing Data from a HAL Quadrupole Gas Analyzer Using an IBM-PC Compatible Computer", Nov. 15, 1995, Space and Environment Technology Center.

Zhifang et al., Test automation on mobile device, May 2010, 7 pages.

Hu et al., Automating GUI testing for Android applications, May 2011, 7 pages.

Tom Yeh, Tsung-Hsiang Chang, and Robert C. Miller, Sikuli: Using GUI Screenshots for Search and Automation, Oct. 4-7, 2009, 10 pages.

Bergen et al., RPC automation: making legacy code relevant, May 2013, 6 pages.

* cited by examiner

ROBOTIC PROCESS AUTOMATION WITH SECURE RECORDING

FIELD OF THE DISCLOSURE

This disclosure relates generally to the field of data processing systems and more particularly to interaction with information on remote computers.

BACKGROUND

Robotic process automation (RPA) is the application of technology that allows employees in a company to configure a computer software or a "robot" to capture and interpret existing applications for processing a transaction, manipulating data, triggering responses and communicating with other digital systems. Conventional RPA systems employ software robots to interpret the user interface of third party applications and to execute steps identically to a human user.

RPA systems employ a variety of recorders to record human implemented actions performed when interacting with a computer application. Such recorders include capability to understand and capture objects and controls in windows displayed on a computer screen, such as: (i) text from drop-down menus; (ii) list boxes; buttons; status from radio buttons and check boxes; (iii) mouse click actions. A variant on such recorders is a screen recorder which record a task or a series of actions on a computer when: (i) building simple tasks for process that involve mouse clicks and keyboard operations; (ii) running an automated process (the task to be recorded) on the same computer on which it was recorded.

While such recorders are quite useful in automating business processes, they are vulnerable to exposing sensitive data, particularly environments such as BFSIs (Banking, Financial Services, and Insurance). While automating a task, capturing such sensitive data (e.g. customer account, IDs etc.) may pose a security risk.

SUMMARY

The secure recording' feature disclosed herein permits flexibility, and hence increased security of information, such as in BFSI environments, when employing RPA. An RPA system provides a first operation mode by permitting full screen images created by an application program, wherein each full screen image of the full screen images comprises one or more data fields, and each field has a label associated therewith. The full screen images are viewable by a user of the robotic process automation system. The RPA system also provides a secure recording mode that is responsive to an operator accessible setting, that prevents presentation of the full screen images, and that permits presentation of one or more selected data fields and associated labels within one or more of the full screen images.

Additional aspects related to the invention will be set forth in part in the description which follows, an in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically.

DETAILED DESCRIPTION

Figure 1:
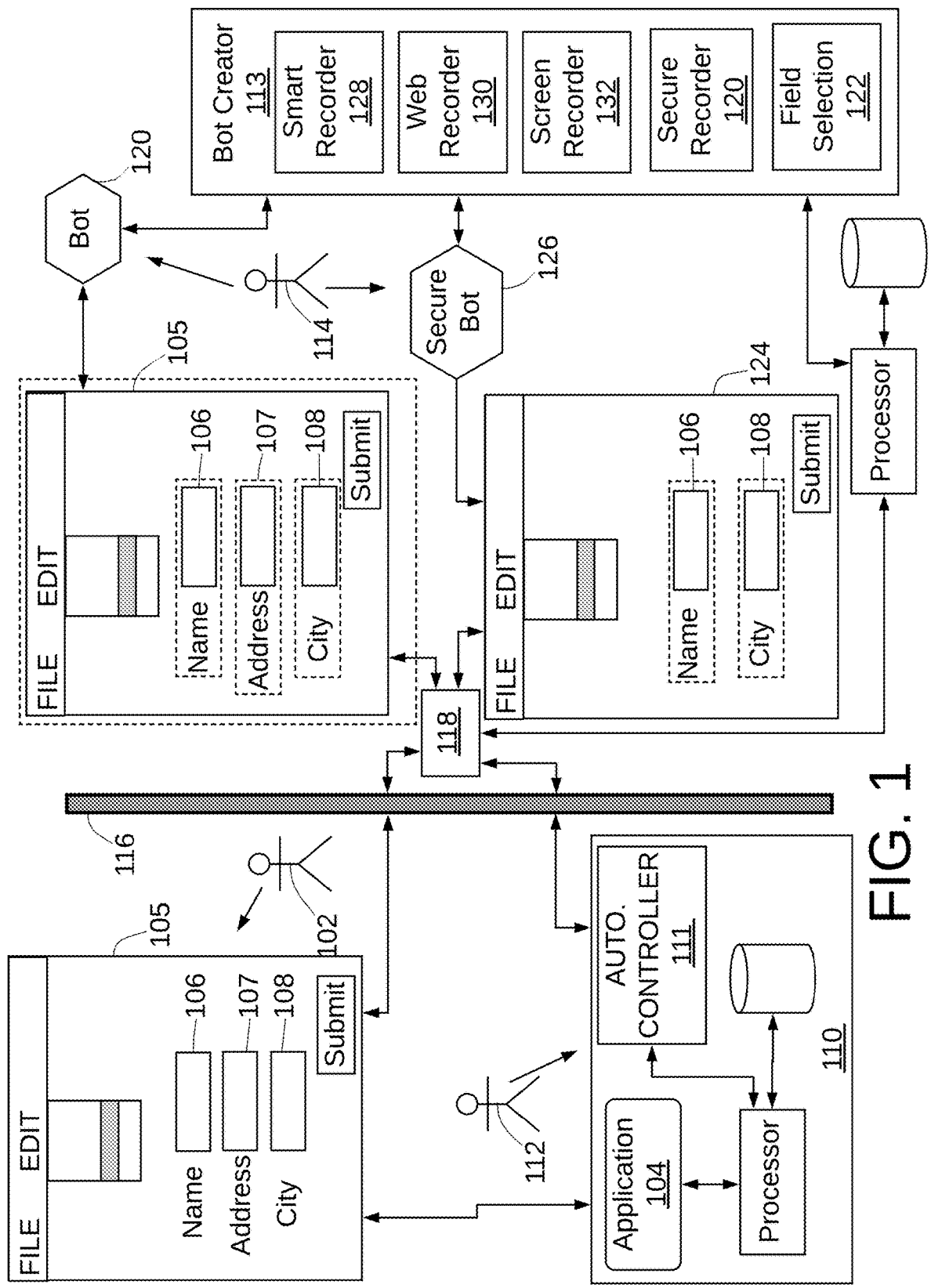
FIG. 1 is a high-level block diagram of an embodiment of an RPA system with secure recording.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

While automating a business process when using a recorder in an RPA system, the commands can capture important details such as object value, image, text, inner HTMLs etc. In environments such as BFSIs (Banking, Financial Services, and Insurance); while automating a task, capturing sensitive data (e.g. customer account, IDs etc.) may pose a security risk. The secure recording embodiment disclosed herein reduces the risk by not permitting capture of sensitive data.

In one aspect a robotic process automation system includes data storage for storing a plurality of bots. Each bot includes one or more configurable commands arranged to perform assigned tasks. A processor is operatively coupled to the data storage and configured to execute instructions that when executed cause the processor to provide to a user a plurality of recorders to permit the user to create one or more bots for storage in the data storage. The instructions implement a smart recorder to permit capture of user interface controls and objects generated by one or more applications, wherein the applications are characterized by one or more application frameworks. The instructions also implement a web recorder to permit capture of pattern-based tasks for web-based applications by automatically, in response to user inputs, extracting web data spread across multiple pages generated by a web-based application. The instructions also implement a screen recorder to permit capture of tasks entered by a user by way of mouse clicks and keyboard operations to one or more screens generated by an application. The instructions also implement a secure recording mode, selectable by an administrator of the robotic process automation system, for preventing capture by the robotic process automation system of an entire screen of information generated by an application-to-be-automated while the user is operating the smart recorder, the web recorder or the screen recorder. The robotic process automation system permits the administrator to permit display to the user of selected fields of information, along with associated labels generated by the application-to-be-automated. In certain embodiments, the robotic process automation system permits the administrator to permit partial display to the user of selected fields of information, along with associated labels generated by the application-to-be-automated. In certain other embodiments, the robotic process automation system permits the administrator to permit display to a first user of a first set of selected fields of information, along with associated labels generated by the application-to-be-automated, and permits display to a second user of a second set of selected fields of information, along with associated labels generated by the application-to-be-automated, wherein the first set of selected fields and the second set of selected fields, differ by a least one field.

In another aspect, a method for securing information in a robotic process automation system includes providing a first operation mode by permitting full screen images created by an application program, wherein each full screen image of the full screen images comprises one or more data fields, with each field having a label associated therewith, wherein the full screen images are viewable by a user of the robotic process automation system. A secure recording mode is provided that is responsive to an operator accessible setting, that prevents presentation of the full screen images, and that permits presentation of one or more selected data fields and associated labels within one or more of the full screen images. In certain embodiments, the operator accessible setting comprises a second setting that causes partial presentation of data fields that are not selected by the administrator. In certain other embodiments, the operator accessible setting comprises a third setting that permits presentation of a first set of one or more selected data fields and associated labels within one or more of the full screen images to a first user and that permits presentation of a second set of one or more selected data fields and associated labels within one or more of the full screen images to a second user, wherein the first set of selected data fields and the second set of selected data fields, differ by a least one field.

In another aspect, a robotic process automation system includes a first recorder to enable recordation by a user of the robotic process automation system of a sequence of interactions with an application that operates independently of the robotic process automation system and that generates one or more screens of information, with certain of the screens including one or more fields to permit input of information to the application. The first recorder operates to cause capture and storage of an image of each screen of information generated by the application that contains a field for input of information. The first recorder also operates to cause capture of an image of each field and associated label contained on each screen of information. The robotic process automation system further includes a secure recorder, selectable by an administrator, that prevents the first recorder from capturing an image of an entire screen of information generated by the application, and that permits capture of an image of any field, and associated label, permitted by the administrator to be captured by the user. In certain embodiments, the secure recorder causes partial display of information in any field other than fields permitted by the administrator to be captured by the user. In other embodiments, the secure recorder is selectable by the administrator to operate in a multi-user mode wherein the administrator permits a first set of fields to be captured by a first user and wherein the administrator permits a second set of fields, that partially overlaps with the first set of fields, or that does not overlap with the first set of fields, to be captured by a second user.

FIG. 1 is a high-level block diagram of an embodiment of an RPA system 10 with secure recording. A user 102 interacts with an application 104 via one or more application screens, one of which is seen at 106 which is provided via a conventional computer display (not shown) to identify information shown in various fields such as name field 106, address field 107 and city field 108 that are generated by application 104. In certain environments, the information provided by application 104 may contain sensitive information the distribution or viewing of which may be subject to various regulatory restrictions.

The application 104 is executed by a computer system 110 which includes processing capability and storage. The computer system 110 also executes a local instance of automation controller software 111 that may be enabled by a system administrator 113 to enable operation of a RPA system 10, which may be remotely located from system 110, user 102 and/or system administrator 112. Automation controller 111, resident on computer system 110, operates in conjunction with RPA system 10, to interact with computer system 110. The RPA system 10 sends automation commands and queries to the automation controller 111, while respecting the security compliance protocols of computer system 110.

RPA system, seen generally at 10, operates to permit automation of one or more computer implemented business processes. The RPA system 10 implements a bot creator 112 that is used by an RPA user 114, to create one or more bots that are used to automate various business processes executed by one or more computer applications such as application 109. RPA user 114 may access application 109 remotely and may see the same screen 104 as seen by user 102. In certain embodiments, a compliance boundary 116 may be implemented in connection with remote access module 118. Compliance boundary 116 represents a logical boundary, across which, any transfer of data or other information is controlled by agreements between parties. In certain embodiments, remote access module 118 may operate to prevent RPA user 114 from performing certain tasks on system 110, by way of example and not limitation, copying files, loading cookies, or transmitting data from computer system 110, through or beyond compliance boundary 116 via the internet or via any other output device that would violate the security protocols established by the computer system 110. The remote access module 118 may take the form of remote desktop products available from Citrix or Microsoft, which permit connection to a remote computer, such as computer system 110, to establish a communication link between system 10 and system 110 to permit apps, files, and network resources to be made available from computer system 110 to computer system 10.

RPA system 10, which is executed by processing capability and associated storage operates to enable RPA user 114 to employ various recorders provided by bot creator 113 to capture various processes implemented by one or more applications, such as application 109. The bot creator 113 preferably includes a variety of recorders that permit recording of various inputs performed by for example a user of application 109 to enable automation by replay of the recorded inputs. For example, entry of data into various fields 106, 107 and 108 may be captured by bot 120 generated by user (bot creator) 113. In operation, if user 113 wishes to automate the entry of data into fields in screen 105, the bot 120 will capture an image of screen 105 and will capture an image of the various fields selected by user 114 for capture. For example, in FIG. 1, as seen by the dotted lines, RPA user 114 has designated for capture, name field 106, address field 107 and city field 108. The RPA system 10 responds by capturing an image of screen 105 and an image of fields 106, 107 and 108 and their associated labels, "Name", "Address", and "City".

In certain instances, administrator 112 may choose to prevent RPA user 114 from viewing certain information, such as for example to ensure compliance with various regulatory restrictions. In certain implementations of system 10, the system 110 on which application 104 runs may be located remotely from RPA user 114. For example, system 110 may be located in country A which limits storage of data pertaining to BFSIs of residents of country A to within country A. In such a situation, RPA user 114, who may be in country B, may be permitted to view such data but storage of such data, or portions thereof, may occur outside of country A in the process of operation of system 10 (which may be in country B or another country C). In such a situation, secure recording may be enabled in system 10.

In such an instance, administrator 112 may employ commands implemented by RPA system 10 to enable secure recorder 120 to disable viewing of all information generated by application 104 by RPA user 114. If the administrator 112 wishes to have certain processes implemented by application 104 to be automated, the administrator 112 may employ field selection module 122, provided by bot creator 113, to enable viewing of specific fields selected by administrator 112 for viewing by RPA user 114.

RPA system 10 includes software robot (bot) creator 113 which operates to enable user 114 to automate tasks by use of configurable commands arranged to perform the assigned tasks. Bot creator 113 generates an execution file, such as bot 120 by processing operations that may include reading a task file, scanning for event dependencies and embedding files and links needed for remote execution of the execution file, storing the dependencies in a dependency file, scanning for security, such as insuring the compliance boundary parameters are present and functional, and verifying the task file for proper formatting.

Bot creator 113 includes secure recording module 120 which may be enabled by administrator 112 to prevent screen images such as seen at 105 from being captured by user 114. With secure recording enabled, the RPA system 10 may be configured to permit capture of individual fields, such as seen at screen 124. In secure recording mode, individual fields may be designated for viewing and capture by user 114 by way of field selection module 122. For example, the RPA system 10 may be configured to permit capture of information in a manner that obscures Personally Identifiable Information (PII). For example, a social security number or driver's license number may be prevented from being captured in its entirety but in certain configurations, selected portions, such as the last four digits, may be permitted to be captured. An example is seen at 124 where name and city fields 106 and 108 are visible to user 114 for capture but address field 107 is not visible and therefore not available for capture. This is achieved by enabling secure recording mode by secure recording module 120, which disables presentation of entire screens generated by application 104 to user 114. The fields that are permitted to be viewed and possibly captured by user 114 are enabled by way of field selection module 122 which permits administrator 112, or someone authorized by administrator 112, to identify the fields in screens generated by the application 104 that may be visible and able to be captured by user 114 in secure recording mode. Field selection module 122 interacts with application 104 to permit administrator 112 to designate fields employed by the application, such as for example, fields 106, 107 and 108, preferably by interactive means, such as by graphically selecting the desired fields permitted to be viewed by user 114, or alternatively, by selecting the desired fields that user 114 is not permitted to view. The fields selected by the administrator for display/viewing by user 114 are caused to be stored by the field selection module 122 for use by secure recorder 120 during generation of secure bot 126. In an alternative embodiment, the field selection module causes to be stored the fields identified by the administrator to be excluded from use by the secure recorder 120.

Enabling secure recorder 120 causes generation of secure bot 126 which operates to prevent capture of the entire screen of information 105 as captured by bot 120. Instead secure bot 126 captures only the fields permitted to be captured by administrator 112. As seen in FIG. 1, only the name field 106 and city field 108 and associated labels are visible to and therefore able to be captured by secure bot 126.

RPA system 10 preferably includes a variety of recording capability to facilitate task automation by user 114. Three recorders are shown in FIG. 1: smart recorder 128, web recorder 130 and screen recorder 132. The secure recording mode implemented by secure recording module 120 may operate in conjunction with all three recorders shown in FIG. 1. Smart recorder 128 operates to capture user interface (UI) controls and objects for applications that operate in accordance with a variety of frameworks, such as Silverlight, Java, html, and Flex. This allows it to be more resilient to automation obstacles such as screen resolution changes. It can be used to record tasks for legacy as well as web-based applications 104. Web recorder 130 is used to automate pattern-based tasks for web-based applications, such as automatically extracting web data spread across multiple pages with just a few clicks. Screen recorder 132 can be used to build simple tasks for processes that involve mouse clicks and keyboard operations, and when the recorded task is run on the same computer on which it was recorded.

Certain details of operation of the RPA system 10 are provided in U.S. patent application Ser. No. 14/988,877, filed on Jan. 6, 2016 and assigned to the assignee of the present application, which is hereby incorporated by reference. The bots 120 and 126 contain one or more of a series of tasks having commands, and other instructions having variables, executable by application 104. In one embodiment bot creator 113 creates bots 120 and 126 by assembling tasks into execution files, which may require validating the tasks and organizing nested tasks, including collecting nested task information for each task, and accounting for all dependencies to ensure that files, tasks, and environments for running on system 110. At least one or more dependencies will, subject to a system 110 set of compliance boundary parameters, enable RPA system 10 to create specific adapters that enable automated application 104 to be executed, when the adapters are incorporated into the system 110.

Figure 2:
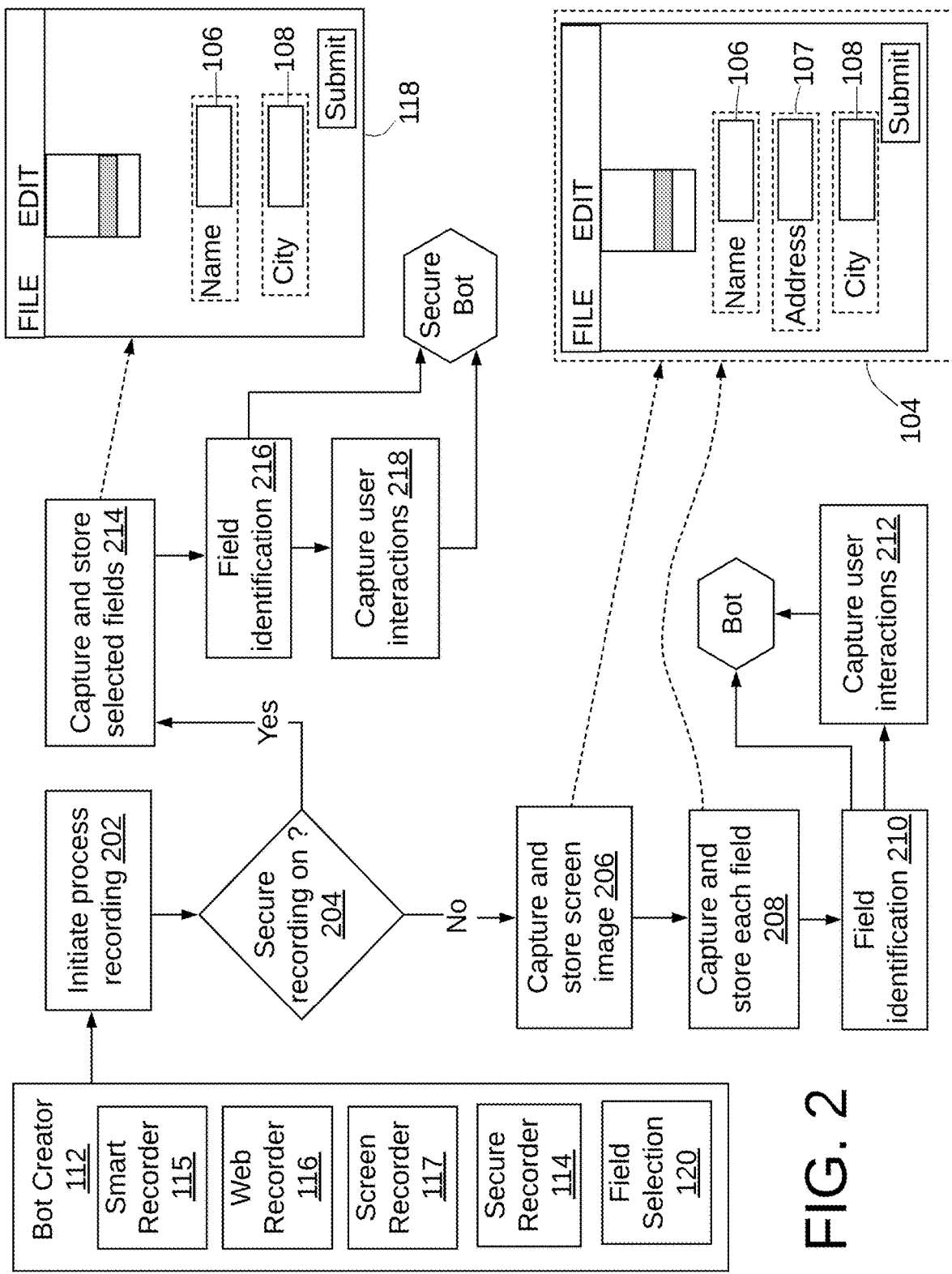
FIG. 2 is a flow diagram illustrating bot creation in accordance with one embodiment.

FIG. 2 illustrates at a high level, operation of bot creator 113 in generation of bot 120 and secure bot 126. Selection by user 114 of an appropriate recorder 128, 130, 132 causes creation of a bot and initiation of process recording 202 by recording actions of user 114. At 204, a test is performed to check if secure recorder 120 is enabled to permit secure recording mode. In the embodiment shown in FIG. 2, each of the recorders 128, 130, 132 is operable in secure recording mode. If secure recording is not enabled then the selected recorder (128, 130, 132) causes at 206, capture and storage of screen image 105, as indicated by the dotted line to screen image 105. At 208, each field in the screen 105 is also captured, as indicated by the dotted line to screen image 105. In the example shown in FIG. 2, this causes an image of fields 106, 107, 108 and their associated labels to be captured and stored. At 208, the captured fields are identified. The identification will vary depending upon the recorder selected. Smart recorder 128 can identify fields that may be exposed by applications that operate in accordance with a variety of frameworks, such as Silverlight, Java, html, and Flex. It can be used to record tasks for legacy as well as web-based applications 104. Web recorder 130 can identify fields within web-based applications. Screen recorder 132, which can be used to build simple tasks for processes that involve mouse clicks and keyboard operations may employ optical character recognition techniques for field identification. The identified fields are stored to bot 120, along with interactions by user 114 with application 104, such as mouse clicks, and keyboard entries.

If secure recording is enabled, as determined at 204, then at 214, only the fields designated via field selection module by or under control of administrator 112 are captured. In secure recording mode capture of the entire screen image 105 is not permitted. As seen, only fields 106 and 108 are visible and therefore available for capture. At 216, field identification, as described above in connection with 210 is performed with the results stored to secure bot 126. Finally, at 218, user interactions as described above in connection with 212 is performed.

Figure 3B:
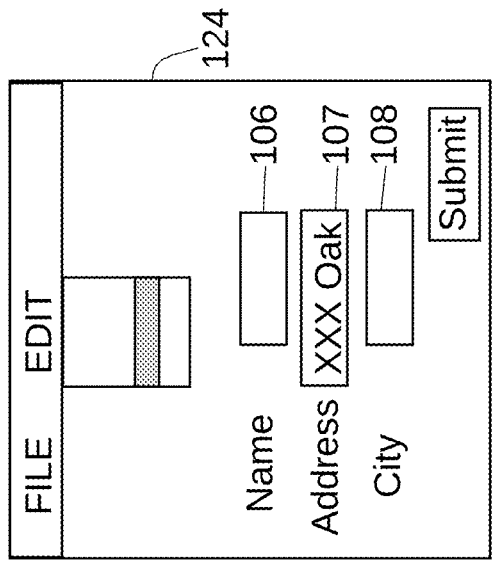
FIGS. 3A and 3B illustrate alternative embodiments of fields within secure recording.
Figure 3A:
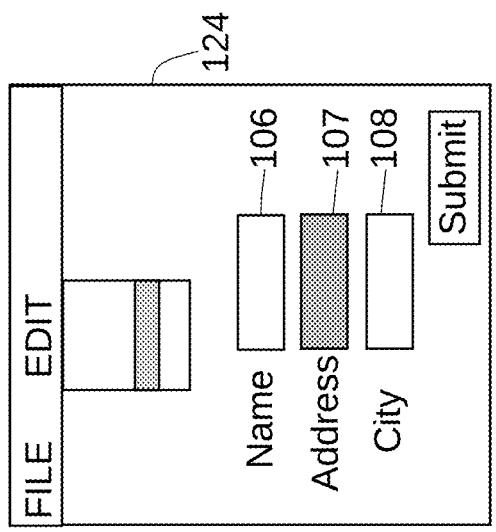

FIGS. 3A and 3B illustrate alternative embodiments of fields within secure recording. In the embodiment of FIG. 1, field selection module was employed to select display to user 114 of fields 106 and 108 and to suppress display of address field 107. In the embodiment of FIG. 3A, field selection module operates to permit display of field 107 and its associated label 'address', but to cause the contents of field 107 to be obscured by greying or shading the contents of the field. FIG. 3B illustrates another embodiment where address field is shown, as in FIG. 3A, but a portion of the content of the address field is obscured by replacing the street number in the field with the characters, XXX, while permitting display of the remainder of the address field, in this case the street name 'Oak'. The embodiments shown in FIGS. 3A and 3B may be employed as additional modes within the embodiment shown in FIG. 1 or may be employed by themselves as replacement for the embodiment in FIG. 1.

Figure 4:
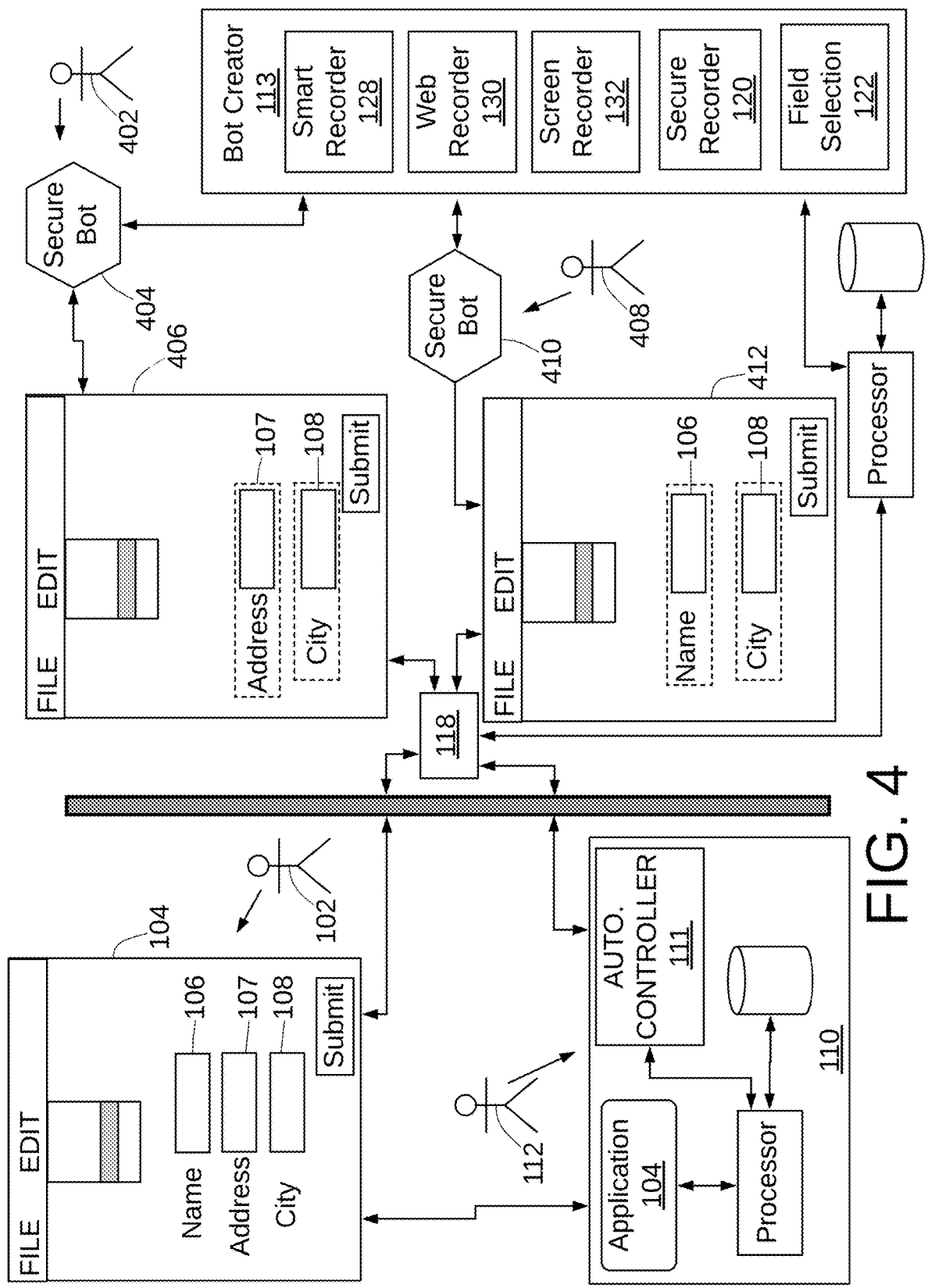
FIG. 4 is a high-level block diagram of an alternative embodiment of an RPA system with secure recording.

FIG. 4 is a high-level block diagram of an alternative embodiment of an RPA system with secure recording. In FIG. 4, bot creator 113 is employed by administrator 112 to permit user 402 to deploy secure bot 404, to interact with screen 406 as generated by application 104. As seen, administrator 112 has employed field selection module 122 to cause fields 107 and 108 to be displayed to user 402. User 402 can thus see the address field 107 and city field 108 but not the name field 106. Administrator 112 has also employed bot creator 113 to permit a second user 408, to deploy secure bot 410, to interact with screen 412 as generated by application 104. The RPA system 110 permits the administrator 112 to employ the field selection module 122 to provide different data to different users as a mechanism to permit secure recording of computer implemented processes. In the embodiment of FIG. 4, user 406 can see the address and city of an individual and user 412 can see the name and city of an individual but neither user 406, 412 can see all of the information pertaining to the individual whose information is shown in screens 406 and 412. The embodiment shown in FIG. 4 may be employed as an additional mode within the embodiment shown in FIG. 1 or may be employed by itself as replacement for the embodiment in FIG. 1.

Figure 5:
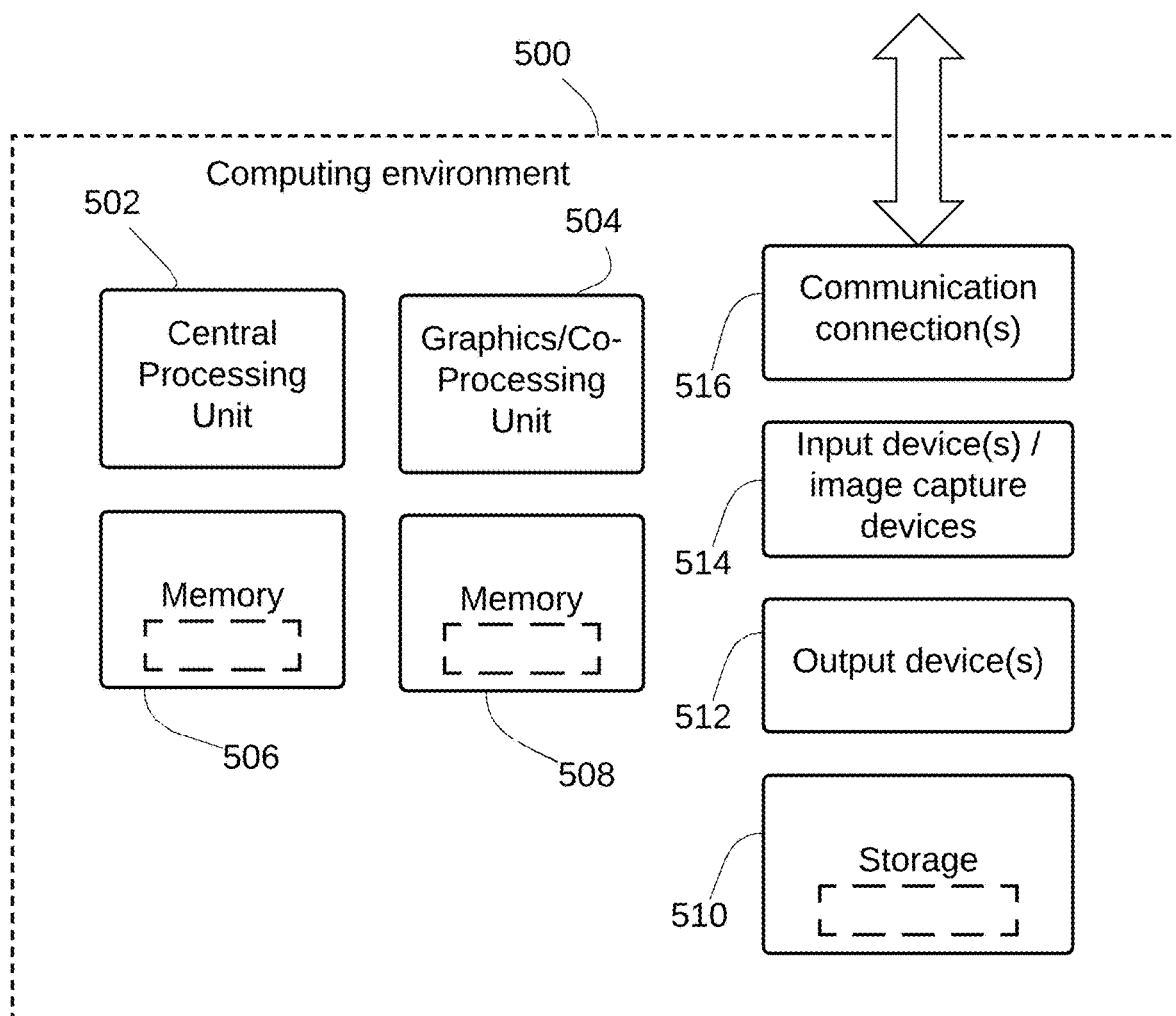
FIG. 5 illustrates a block diagram of hardware that may be employed in an implementation of the system 10 or system 110.

FIG. 5 depicts a generalized example of a suitable general-purpose computing system 500 in which the described innovations may be implemented in order to improve the processing speed and efficiency with which the computing system 500 operates to perform the functions disclosed herein. With reference to FIG. 5 the computing system 500 includes one or more processing units 502, 504 and memory 506, 508. The processing units 502, 506 execute computer-executable instructions. A processing unit can be a general-purpose central processing unit (CPU), processor in an application-specific integrated circuit (ASIC) or any other type of processor. The tangible memory 506, 508 may be volatile memory (e.g., registers, cache, RAM), non-volatile memory (e.g., ROM, EEPROM, flash memory, etc.), or some combination of the two, accessible by the processing unit(s). The hardware components in FIG. 5 may be standard hardware components, or alternatively, some embodiments may employ specialized hardware components to further increase the operating efficiency and speed with which the system 100 operates.

Computing system 500 may have additional features such as for example, storage 510, one or more input devices 514, one or more output devices 512, and one or more communication connections 516. An interconnection mechanism (not shown) such as a bus, controller, or network interconnects the components of the computing system 500. Typically, operating system software (not shown) provides an operating system for other software executing in the computing system 500, and coordinates activities of the components of the computing system 500.

The tangible storage 510 may be removable or non-removable, and includes magnetic disks, magnetic tapes or cassettes, CD-ROMs, DVDs, or any other medium which can be used to store information in a non-transitory way and which can be accessed within the computing system 500. The storage 510 stores instructions for the software implementing one or more innovations described herein.

The input device(s) 514 may be a touch input device such as a keyboard, mouse, pen, or trackball, a voice input device, a scanning device, or another device that provides input to the computing system 500. For video encoding, the input device(s) 514 may be a camera, video card, TV tuner card, or similar device that accepts video input in analog or digital form, or a CD-ROM or CD-RW that reads video samples into the computing system 500. The output device(s) 512 may be a display, printer, speaker, CD-writer, or another device that provides output from the computing system 500.

The communication connection(s) 516 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system. It should be understood that functions/operations shown in this disclosure are provided for purposes of explanation of operations of certain embodiments. The implementation of the functions/operations performed by any particular module may be distributed across one or more systems and computer programs and are not necessarily contained within a particular computer program and/or computer system.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A process automation system comprising:
   data storage for storing a plurality of bots, each bot comprising one or more configurable commands arranged to perform assigned tasks; and
   a processor operatively coupled to the data storage and configured to execute instructions that when executed cause the processor to provide to a user a plurality of recorders to permit the user to create one or more bots for storage in the data storage, the instructions implementing:
   a plurality of recorders comprising,
      a smart recorder to permit capture of user interface controls and objects generated by one or more applications, wherein the applications are characterized by one or more application frameworks;
      a web recorder to permit capture of pattern-based tasks for web-based applications by automatically, in response to user inputs, extracting web data spread across multiple pages generated by a web-based application;
      a screen recorder to permit capture of tasks entered by a user by way of user input operations to one or more screens generated by an application; and
   a secure recording mode, selectable by an administrator of the process automation system, for preventing capture by a selected one or more of the plurality of recorders of an entire screen of information generated by an application-to-be-automated while the user is operating the selected one or more of the plurality of recorder;
   wherein the robotic process automation system permits the administrator to permit display to the user of selected fields of information, along with associated labels generated by the application-to-be-automated, for capture by the selected one or the recorders.

2. The process automation system of claim 1 wherein the system permits the administrator to permit partial display to the user of selected fields of information, along with associated labels generated by the application-to-be-automated for capture by the selected one or the recorders.

3. The process automation system of claim 1 wherein the system permits the administrator to permit display to a first user of a first set of selected fields of information, along with associated labels generated by the application-to-be-automated for capture by a recorder used by the first user, and to permit display to a second user of a second set of selected fields of information, along with associated labels generated by the application-to-be-automated for capture by a recorder used by the second user, wherein the first set of selected fields and the second set of selected fields, differ by a least one field.

4. The process automation system of claim 1 wherein the secure recording mode is further operable to permit the administrator to configure the secure recording mode to cause to be stored fields that are identified by the administrator to be excluded from use recording during the secure recording mode.

5. The process automation system of claim 1 wherein the processor is further configured with instructions that when executed cause the processor to implement a remote access module that establishes a communication link between the processor and a remotely located system, the communication link permitting apps, files, and network resources to be made available to the processor from the remotely located system across a compliance boundary and wherein the application-to-be-automated is accessed by way of the remote access module across the compliance boundary.

6. A method for securing information in a robotic process automation system comprising:
   providing a first operation mode by permitting full screen images created by an application program, wherein each full screen image of the full screen images comprises one or more data fields, with each field having a label associated therewith, wherein the full screen images are viewable by a user of the robotic process automation system; and
   providing a secure recording mode, responsive to an operator accessible setting, that prevents presentation of the full screen images, and that permits presentation of one or more selected data fields and associated labels within one or more of the full screen images, for capture during the secure recording mode.

7. The method of claim 6 wherein the operator accessible setting comprises a second setting that causes partial presentation of data fields that are not selected by the administrator, for capture during the secure recording mode.

8. The method of claim 6 wherein the operator accessible setting comprises a third setting that permits presentation of a first set of one or more selected data fields and associated labels within one or more of the full screen images to a first user for capture by a recorder used by the first user and that permits presentation of a second set of one or more selected data fields and associated labels within one or more of the full screen images to a second user, for capture by a recorder used by the second user, wherein the first set of selected data fields and the second set of selected data fields, differ by a least one field.

9. The method of claim 6 further comprising establishing a communication link between the robotic automation system and a remotely located system, the communication link permitting apps, files, and network resources to be made available to the robotic automation system from the remotely located system across a compliance boundary and wherein the application program is accessed by way of the remote access module across the compliance boundary.

10. The method of claim 6 further comprising generating an execution file employing output of the secure recording mode by processing operations by processing operations performed on the application program comprising reading a task file, scanning for event dependencies and embedding files and links needed for remote execution of the execution file, storing the dependencies in a dependency file, scanning for security, such as insuring compliance boundary parameters are present and functional, and verifying the task file for proper formatting.

11. A tangible storage medium, having stored thereupon one or more program modules comprising computer-executable instructions for execution on a computer system, the computer-executable instructions executing on a server processor to cause the computer system to implement a robotic process automation system comprising:
a first recorder to enable recordation by a user of the robotic process automation system of a sequence of interactions with an application that operates independently of the robotic process automation system and that generates one or more screens of information, with certain of the screens including one or more fields to permit input of information to the application, the first recorder operating to cause capture and storage of an image of each screen of information generated by the application that contains a field for input of information, the first recorder further operating to cause capture of an image of each field and associated label contained on each screen of information captured by the first recorder; and
a secure recorder, selectable by an administrator, that prevents the first recorder from capturing an image of an entire screen of information generated by the application, and that permits capture of an image of any field, and associated label, permitted by the administrator to be captured by the user.

12. The tangible storage medium of claim 11 comprising further computer-executable instructions that cause the secure recorder to partially display of information in any field other than fields permitted by the administrator to be captured by the user.

13. The tangible storage medium of claim 11 comprising further computer-executable instructions that cause the secure recorder to be selectable by the administrator to operate in a multi-user mode wherein the administrator permits a first set of fields to be captured by a first user and wherein the administrator permits a second set of fields, that partially overlaps with the first set of fields, or that does not overlap with the first set of fields, to be captured by a second user.

14. The tangible storage medium of claim 11 wherein the first recorder comprises a smart recorder to permit capture of user interface controls and objects generated by one or more applications, wherein the applications are characterized by one or more application frameworks.

15. The tangible storage medium of claim 11 wherein the first recorder comprises a web recorder to permit capture of pattern-based tasks for web-based applications by automatically, in response to user inputs, extracting web data spread across multiple pages generated by a web-based application.

16. The tangible storage medium of claim 11 wherein the first recorder comprises a screen recorder to permit capture of tasks entered by a user by way of user input operations to one or more screens generated by an application.

17. The tangible storage medium of claim 11 comprising further computer-executable instructions that implement a remote access module that establishes a communication link between the server processor and a remotely located system, the communication link permitting apps, files, and network resources to be made available to the server processor from the remotely located system across a compliance boundary and wherein the application is accessed by way of the remote access module across the compliance boundary.

18. The tangible storage medium of claim 11 comprising further computer-executable instructions that cause the first recorder to generate an execution file by processing operations performed on the application comprising reading a task file, scanning for event dependencies and embedding files and links needed for remote execution of the execution file, storing the dependencies in a dependency file, scanning for security, such as insuring compliance boundary parameters are present and functional, and verifying the task file for proper formatting.

19. The tangible storage medium of claim 11 comprising further computer-executable instructions permit the administrator to configure the secure recorder to cause to be stored, fields that are identified by the administrator to be excluded from use by the secure recorder.

20. The tangible storage medium of claim 11 comprising further computer-executable instructions that permit the administrator to permit a certain portion of a field to be displayed and a certain portion of the field to be obscured.

* * * * *